(12) United States Patent
Lake

(10) Patent No.: US 12,022,949 B2
(45) Date of Patent: Jul. 2, 2024

(54) DRIVE MOTOR-LINEAR ACTUATOR SYSTEM FOR POWERED LIFT OR POWERED RECLINING CHAIRS

(71) Applicant: HIDDEN LAKE 822, LLC, Tupelo, MS (US)

(72) Inventor: Stephen R. Lake, Tupelo, MS (US)

(73) Assignee: HIDDEN LAKE 822, LLC, Tupelo, MS (US)

( * ) Notice: Subject to any disclaimer, the term of this patent is extended or adjusted under 35 U.S.C. 154(b) by 106 days.

(21) Appl. No.: 17/965,003

(22) Filed: Oct. 13, 2022

(65) Prior Publication Data

US 2024/0122345 A1 Apr. 18, 2024

(51) Int. Cl.
| | |
|---|---|
| A47C 1/024 | (2006.01) |
| A47C 1/032 | (2006.01) |
| A47C 1/035 | (2006.01) |
| A47C 3/20 | (2006.01) |
| A61G 5/14 | (2006.01) |
| H02K 7/116 | (2006.01) |

(52) U.S. Cl.
CPC ........ *A47C 1/03211* (2013.01); *A47C 1/0242* (2013.01); *A47C 1/0246* (2013.01); *A47C 1/035* (2013.01); *A47C 3/20* (2013.01); *H02K 7/1166* (2013.01); *A61G 5/14* (2013.01)

(58) Field of Classification Search
CPC ..... A47C 1/035; A47C 1/0242; A47C 1/0246; A47C 1/03211; A61G 5/14; H02K 7/1166; B60N 2/23; B60N 2/233
USPC .... 297/85 M, 330, 362.11, 362.12, DIG. 10, 297/362.14
See application file for complete search history.

(56) References Cited

U.S. PATENT DOCUMENTS

| | | | | |
|---|---|---|---|---|
| 4,850,645 A | * | 7/1989 | Crockett | A61G 5/14 297/DIG. 10 |
| 4,946,222 A | * | 8/1990 | Matson | A47C 1/0345 297/DIG. 10 |
| 5,120,109 A | * | 6/1992 | Rangoni | B60N 2/2222 297/284.3 |
| 5,136,889 A | * | 8/1992 | Hill | F16H 25/2015 297/330 X |
| 5,174,167 A | * | 12/1992 | Hill | F16H 25/2015 297/330 X |

(Continued)

FOREIGN PATENT DOCUMENTS

| | | |
|---|---|---|
| CA | 2999512 | 3/2017 |
| CA | 3040212 | 10/2020 |

(Continued)

*Primary Examiner* — Rodney B White
(74) *Attorney, Agent, or Firm* — Law Offices of Steven W. Weinrieb

(57) ABSTRACT

A drive motor-linear actuator system, for use within, for example, powered chairs, comprises a single drive motor provided with a pair of output drive shafts, and a pair of laterally spaced, left and right-side linear actuators operatively engaged respectively with the pair of output drive shafts. In this manner, the single drive motor can simultaneously actuate both linear actuators in a synchronized manner. The linear actuators are disposed near the opposite left and right sides of the chair so as to provide enhanced stability to the chair while reducing the weight and cost of the chair since only one single drive motor is required to drive both linear actuators.

18 Claims, 5 Drawing Sheets

(56) References Cited

U.S. PATENT DOCUMENTS

| | | | |
|---|---|---|---|
| 5,215,351 A * | 6/1993 | Lapointe | A61G 5/14 297/DIG. 10 |
| 5,294,179 A * | 3/1994 | Rudes | A61G 5/14 297/DIG. 10 |
| 5,467,957 A * | 11/1995 | Gauger | B60N 2/02246 74/89.33 |
| 5,575,531 A * | 11/1996 | Gauger | B60N 2/067 297/362.11 X |
| 5,992,931 A | 11/1999 | LaPointe et al. | |
| 6,050,641 A * | 4/2000 | Benson | B60N 2/66 297/284.7 |
| 6,259,175 B1 | 7/2001 | Alfano et al. | |
| 7,255,397 B2 * | 8/2007 | Olcheski | A61G 5/14 297/DIG. 10 |
| 7,543,885 B2 * | 6/2009 | Pollard | A47C 1/024 297/85 |
| 7,575,279 B2 * | 8/2009 | Robertson | A47C 7/506 297/DIG. 10 |
| 7,631,937 B2 * | 12/2009 | Robertson | A47C 1/0242 297/DIG. 10 |
| 7,699,389 B2 * | 4/2010 | Robertson | A47C 1/0242 297/DIG. 10 |
| 7,735,912 B2 * | 6/2010 | Robertson | A47C 7/506 297/DIG. 10 |
| 8,109,164 B2 | 2/2012 | Tseng et al. | |
| 8,398,169 B2 | 3/2013 | LaPointe | |
| 8,403,409 B2 * | 3/2013 | Pollard | A47C 1/024 297/85 |
| 8,696,053 B2 | 4/2014 | LaPointe | |
| 8,696,054 B2 * | 4/2014 | Crum | A47C 1/0355 297/85 M |
| 8,727,433 B2 * | 5/2014 | Lawson | A47C 1/0355 297/DIG. 10 |
| 8,944,498 B2 * | 2/2015 | Lawson | A61G 5/14 297/DIG. 10 |
| 8,991,925 B2 | 3/2015 | LaPointe | |
| 9,016,788 B1 * | 4/2015 | Pollard | A47C 1/024 297/85 |
| 9,241,571 B2 * | 1/2016 | Robertson | A47C 1/03294 |
| 9,289,338 B1 * | 3/2016 | Swenson | A61G 5/125 |
| 9,326,608 B1 | 5/2016 | Hoy et al. | |
| 9,351,890 B2 * | 5/2016 | Hough | A61G 5/1005 |
| 9,358,167 B2 | 6/2016 | LaPointe et al. | |
| 9,468,295 B2 | 10/2016 | Lawson | |
| 9,713,559 B2 * | 7/2017 | Hough | A47C 1/032 |
| 9,848,704 B1 * | 12/2017 | Pollard | A47C 1/035 |
| 10,118,508 B2 | 11/2018 | Bowen et al. | |
| 10,322,044 B2 * | 6/2019 | Upchurch | A61G 5/1059 |
| 10,334,951 B2 * | 7/2019 | Robertson | A47C 1/0355 |
| 10,357,107 B2 | 7/2019 | Jacobs et al. | |
| 10,376,060 B2 * | 8/2019 | Marcantoni | A47C 1/0342 |
| 10,383,447 B2 | 8/2019 | Sigmon | |
| 10,405,660 B2 | 9/2019 | Robertson | |
| 10,441,081 B2 * | 10/2019 | Carrera | A47C 1/024 |
| 10,507,146 B1 * | 12/2019 | Alhajery | A61G 5/14 |
| 10,821,861 B2 * | 11/2020 | Line | B60N 2/546 |
| 10,898,008 B2 * | 1/2021 | Eskridge, III | A61G 7/0755 |
| 10,932,570 B2 | 3/2021 | Crawford et al. | |
| 10,932,974 B2 * | 3/2021 | Eskridge, III | A61G 7/1025 |
| 10,987,262 B2 * | 4/2021 | Upchurch | A47C 1/024 |
| 11,197,549 B1 | 12/2021 | LaPointe et al. | |
| 11,304,864 B2 * | 4/2022 | Sweeney | A61G 7/015 |
| 11,478,082 B2 * | 10/2022 | Gervais | A47C 1/022 |
| 11,559,448 B2 * | 1/2023 | Upchurch | A47C 3/20 |
| 2001/0035668 A1 * | 11/2001 | Gaffney | A61G 5/14 297/85 M |
| 2002/0125746 A1 * | 9/2002 | Gaffney | A47C 1/0345 297/85 M |
| 2006/0103209 A1 * | 5/2006 | Olcheski | A61G 5/14 297/330 |
| 2007/0132292 A1 | 6/2007 | Robertson | |
| 2009/0293655 A1 | 12/2009 | Tseng et al. | |
| 2014/0265502 A1 * | 9/2014 | Hough | A47C 1/024 280/47.38 |
| 2016/0128883 A1 * | 5/2016 | Robertson | A47C 1/035 5/613 |
| 2016/0152162 A1 | 6/2016 | Finck | |
| 2017/0136919 A1 * | 5/2017 | Deppe | B60N 2/0284 |
| 2017/0347797 A1 * | 12/2017 | Robertson | A47C 1/0242 |
| 2018/0001729 A1 * | 1/2018 | Goffer | B60G 17/01908 |
| 2019/0217750 A1 | 7/2019 | Gutierrez et al. | |
| 2019/0290005 A1 | 9/2019 | Bryant et al. | |
| 2021/0112983 A1 | 4/2021 | Bryant | |
| 2022/0161691 A1 * | 5/2022 | Zhao | B60N 2/07 |
| 2022/0192378 A1 * | 6/2022 | Gervais | A47C 1/022 |
| 2022/0192905 A1 * | 6/2022 | Sweeney | A61G 7/0755 |
| 2022/0281357 A1 * | 9/2022 | Fuchs | B60N 2/02246 |
| 2023/0062149 A1 * | 3/2023 | Zhao | B60N 2/02246 |

FOREIGN PATENT DOCUMENTS

| | | |
|---|---|---|
| WO | WO 2013/103809 | 7/2013 |
| WO | WO 2021/000994 | 1/2021 |

* cited by examiner

DRIVE MOTOR-LINEAR ACTUATOR SYSTEM FOR POWERED LIFT OR POWERED RECLINING CHAIRS

FIELD OF THE INVENTION

The present invention relates generally to a drive motor-linear actuator system, and more particularly to a drive motor-linear actuator system which can be advantageously utilized within, but not limited to, a powered lift chair or a powered reclining chair.

BACKGROUND OF THE INVENTION

Linear actuators are critically important within conventional powered lift or powered reclining chairs in that they are utilized to move different structural components of such chairs to various different positions whereby the chairs can attain, or be disposed at, their original, start, or home position, at which the person seated in the chair is disposed in a seated upright position, as well as, for example, elevated, TV, or fully reclined positions at which, for example, the footrest of the reclining chair can be moved from a lowered position to an elevated position, while the backrest can be moved from an upright position to a partially or fully reclined position, thereby providing the user of the chair with a particularly desired relaxed position. Examples of such reclining chairs, and/or linear actuators which are or can be utilized within such reclining chairs, are disclosed within U.S. Pat. No. 11,197,549 which issued to LaPointe et al. on Dec. 14, 2021, U.S. Pat. No. 10,932,570 which issued to Crawford et al. on Mar. 2, 2021, U.S. Pat. No. 10,357,107 which issued to Jacobs et al. on Jul. 23, 2019, United States Patent Application Publication 2021/0112983 which was published on Apr. 22, 2021 for Bryant, United States Patent Application Publication 2019/0290005 which was published on Sep. 26, 2019 for Bryant et al., U.S. Pat. No. 10,405,660 which issued on Sep. 10, 2019 to Robertson, U.S. Pat. No. 10,383,447 which issued to Sigmon on Aug. 20, 2019, United States Patent Application Publication 2019/0217750 which was published on Jul. 18, 2019 for Gutierrez et al., U.S. Pat. No. 10,118,508 which issued on Nov. 6, 2018 to Bowen et al., U.S. Pat. No. 9,468,295 which issued on Oct. 18, 2016 to Lawson, U.S. Pat. No. 9,358,167 which issued on Jun. 7, 2016 to LaPointe et al., United States Patent Application Publication 2016/0152162 which was published on Jun. 2, 2016 for Finck, U.S. Pat. No. 9,326,608 which issued on May 3, 2016 to Hoy et al., U.S. Pat. No. 8,991,925 which issued on Mar. 31, 2015 to LaPointe, U.S. Pat. No. 8,696,053 which issued on Apr. 15, 2014 to LaPointe, U.S. Pat. No. 8,398,169 which issued on Mar. 19, 2013 to LaPointe, U.S. Pat. No. 8,109,164 which issued on Feb. 7, 2012 to Tseng et al., U.S. Pat. No. 7,631,937 which issued on Dec. 15, 2009 to Robertson, United States Patent Application Publication 2009/0293655 which was published on Dec. 3, 2009 for Tseng et al., U.S. Pat. No. 7,575,279 which issued on Aug. 18, 2009 to Robertson, United States Patent Application Publication 2007/0132292 which was published on Jun. 14, 2007 for Robertson, U.S. Pat. No. 6,259,175 which issued on Jul. 10, 2001 to Alfano et al., U.S. Pat. No. 5,992,931 which issued on Nov. 30, 1999 to LaPointe et al., PCT Patent Application Publication WO 2021/000994 which was published on Jan. 7, 2021 for Schuster, Canadian Patent Application Publication 3040212 which was published on Oct. 12, 2020 for Rach, Canadian Patent Application Publication 2999512 which was published on Mar. 30, 2017 for Khandrika, and PCT Patent Application Publication WO 2013/103809 which was published on Jul. 11, 2013 for Lawson.

Continuing further, and with reference being made to FIG. 1, there is disclosed a conventional powered lift mechanism for use within a powered lift chair or a powered reclining chair which is generally indicated by the reference character 100. More particularly, it is seen that the conventional powered lift mechanism 100 comprises a support base 102 upon which is disposed a movable chassis or framework comprising left and right side, laterally spaced footrest support brackets 104,104, left and right side, laterally spaced backrest support brackets 106,106, left and right side armrest support brackets 108,108, a plurality of cross-brace supports, torsion tube supports, and linkage members (not clearly visible but well known in the art) for interconnecting the support base 102, the left and right side, laterally spaced footrest support brackets 104,104, the left and right side, laterally spaced backrest support brackets 106,106, and the left and right side armrest support brackets 108,108 together. A single linear actuator 110 is mounted upon a central rear portion of the support base 102 wherein the drive motor end 112 of the linear actuator 110 is pivotally connected to the central portion of the support base 102 while the opposite distal end of a telescopic rod or tube 114 of the the linear actuator 110 is pivotally connected to a central portion of one of the plurality of cross-brace supports or torsion tube supports.

As illustrated within FIG. 1, the single linear actuator 110 has been actuated such that the telescopic rod or tube 114 of the single linear actuator 110 has been extended whereby the reclining chair 100 has been moved from a lowered, seating position to an elevated, raised, or lifted position. It is well known in the powered lift chair or powered reclining chair industry that a significant portion of the users of these types of powered chairs are the elderly or infirm, and as a result of numerous surveys conducted throughout the industry, one of the most frequent attributes of a powered lift chair or powered reclining chair, as desired by such elderly or infirm users, is the requirement for stability. When, for example, the powered lift chair or powered reclining chair is moved to its elevated position, such users of these chairs may experience fear and panic that the chair may tip over toward one side, due to perceived instability, whereby the occupants of the chair are fearful of experiencing serious injury. Of course, multiple linear actuators could be employed to lift and lower, or actuate or drive, various different sections of the powered lift chairs or powered reclining chairs, however, the use of such additional linear actuators would correspondingly require the incorporation of additional drive motors into the system for actuating, driving, or powering such additional linear actuators, resulting in a significant increase in weight and cost to the powered lift chair or powered reclining chair. In addition, the actuation of the drive motors and the linear actuators must be controlled in a synchronized manner.

A need therefore exists in the art for a new and improved drive motor-linear actuator system. Another need exists in the art for a new and improved drive motor-linear actuator system for use within powered lift or powered reclining chairs. Still another need exists in the art for a new and improved drive motor-linear actuator system for use within powered lift or powered reclining chairs wherein the number of drive motors can effectively be reduced relative to the number of linear actuators that may be required to be, or actually are, incorporated within a particular powered lift or powered reclining chair. Yet another need exists in the art for a new and improved drive motor-linear actuator system for use within powered lift or powered reclining chairs wherein the number of drive motors can effectively be reduced relative to the number of linear actuators that may be required to be, or actually are, incorporated within a particular powered lift or powered reclining chair, whereby the overall weight of the powered lift or powered reclining chair can be significantly reduced. Still yet another need exists in the art for a new and improved drive motor-linear actuator system for use within powered lift or powered reclining chairs wherein the number of drive motors can effectively be reduced relative to the number of linear actuators that may be required to be, or actually are, incorporated within a particular powered lift or powered reclining chair, whereby the overall cost of the powered lift or powered reclining chair can be significantly reduced. A further need exists in the art for a new and improved drive motor-linear actuator system for use within powered lift or powered reclining chairs wherein the number of motor drives can effectively be reduced relative to the number of linear actuators that may be required to be, or actually are, incorporated within a particular powered lift or powered reclining chair, whereby a sufficient number of linear actuators may nevertheless be incorporated within the powered lift or powered reclining chair so as to effectively provide the powered lift or powered reclining chair with the requisite amount of stability which is critically important when the powered lift or powered reclining chair is moved between its lowered and elevated positions.

A still further need exists in the art for a new and improved drive motor-linear actuator system for use within powered lift or powered reclining chairs wherein the number of drive motors can effectively be reduced relative to the number of linear actuators that may be required to be, or actually are, incorporated within a particular powered lift or powered reclining chair, whereby a sufficient number of linear actuators may nevertheless be incorporated within the powered lift or powered reclining chair so as to effectively provide the powered lift or powered reclining chair with the requisite amount of stability, which is critically important when the powered lift or powered reclining chair is moved between its lowered and elevated positions, such that elderly and infirm users of the powered lift or powered reclining chair will feel safe and secure when they are seated within the powered lift or powered reclining chair. A yet further need exists in the art for a new and improved drive motor-linear actuator system for use within powered lift or powered reclining chairs wherein the number of drive motors can effectively be reduced relative to the number of linear actuators that may be required to be, or actually are, incorporated within a particular powered lift or powered reclining chair, whereby a sufficient number of linear actuators may nevertheless be incorporated within the powered lift or powered reclining chair so as to effectively provide the powered lift or powered reclining chair with the requisite amount of stability and synchronized operation, which is critically important when the powered lift or powered reclining chair is moved between its lowered and elevated positions, such that elderly and infirm users of the powered lift or powered reclining chair will feel safe and secure when they are seated within the powered lift or powered reclining chair.

OVERALL OBJECTIVES OF THE INVENTION

An overall objective of the present invention is to provide a new and improved drive motor-linear actuator system. Another overall objective of the present invention is to provide a new and improved drive motor-linear actuator system for use within powered lift or powered reclining chairs. Still another overall objective of the present invention is to provide a new and improved drive motor-linear actuator system for use within powered lift or powered reclining chairs wherein the number of drive motors can effectively be reduced relative to the number of linear actuators that may be required to be, or actually are, incorporated within a particular powered lift or powered reclining chair. Yet another overall objective of the present invention is to provide a new and improved drive motor-linear actuator system for use within powered lift or powered reclining chairs wherein the number of drive motors can effectively be reduced relative to the number of linear actuators that may be required to be, or actually are, incorporated within a particular powered lift or powered reclining chair, whereby the overall weight of the powered lift or powered reclining chair can be significantly reduced. Still yet another overall objective of the present invention is to provide a new and improved drive motor-linear actuator system for use within powered lift or powered reclining chairs wherein the number of drive motors can effectively be reduced relative to the number of linear actuators that may be required to be, or actually are, incorporated within a particular powered lift or powered reclining chair, whereby the overall cost of the powered lift or powered reclining chair can be significantly reduced.

A further overall objective of the present invention is to provide new and improved drive motor-linear actuator system for use within powered lift or powered reclining chairs wherein the number of drive motors can effectively be reduced relative to the number of linear actuators that may be required to be, or actually are, incorporated within a particular powered lift or powered reclining chair, whereby a sufficient number of linear actuators may nevertheless be incorporated within the powered lift or powered reclining chair so as to effectively provide the powered lift or powered reclining chair with the requisite amount of stability which is critically important when the powered lift or powered reclining chair is moved between its lowered and elevated positions. A still further overall objective of the present invention is to provide a new and improved drive motor-linear actuator system for use within powered lift or powered reclining chairs wherein the number of drive motors can effectively be reduced relative to the number of linear actuators that may be required to be, or actually are, incorporated within a particular powered lift or powered reclining chair, whereby a sufficient number of linear actuators may nevertheless be incorporated within the powered lift or powered reclining chair so as to effectively provide the powered lift or powered reclining chair with the requisite amount of stability, which is critically important when the powered lift or powered reclining chair is moved between its lowered and elevated positions, such that elderly and infirm users of the powered lift or powered reclining chair will feel safe and secure when they are seated within the powered lift or powered reclining chair. A yet further overall objective of the present invention is to provide a new and improved drive motor-linear actuator system for use within powered lift or powered reclining chairs wherein the number of drive motors can effectively be reduced relative to the number of linear actuators that may be required to be, or actually are, incorporated within a particular powered lift or powered reclining chair, whereby a sufficient number of linear actuators may nevertheless be incorporated within the powered lift or powered reclining chair so as to effectively provide the powered lift or powered reclining chair with the requisite amount of stability and synchronized operation, which is critically important when the powered lift or powered reclining chair is moved between its lowered and elevated positions, such that elderly and infirm users of the powered lift or powered reclining chair will feel safe and secure when they are seated within the powered lift or powered reclining chair.

SUMMARY OF THE INVENTION

In accordance with the principles and teachings of the present invention, there is provided a new and improved drive motor-linear actuator system for use within, for example, powered lift or powered reclining chairs, wherein a single drive motor is mounted upon a central portion of the chair base support, and wherein the single drive motor is provided with a pair of output drive shafts which extend outwardly from opposite sides or ends of the single drive motor. The distal end portions of the pair of output drive shafts actually comprise oppositely threaded output worm shafts which are adapted to be respectively engaged with a pair of laterally spaced, left and right-side worm gears that are respectively disposed within a pair of laterally spaced, left and right-side linear actuators. The pair of linear actuators may be laterally spaced from each other by a predetermined distance and yet both are operatively connected to the chair base at or near left and right side positions of the chair chassis or framework such that both linear actuators are simultaneously actuated in a synchronized manner and can therefor perform their required functions, when needed, so as to actuate different components of the powered lift or powered reclining chair to their elevated, lowered, extended, or retracted positions in a coordinated manner. As a result of utilizing a single drive motor for driving the pair of linear actuators, the weight and cost of the powered lift or powered reclining chair is significantly reduced, as compared to a chair utilizing two drive motors to drive two linear actuators. Still yet further, the single drive motor-dual linear actuator system automatically synchronizes the actuation of the dual linear actuators, as a result of the two linear actuators being simultaneously driven by the single drive motor, whereby the stability of the chair is markedly improved since the pair of linear actuators, driven by the single drive motor, are disposed along or near the left and right sides of the powered lift or powered reclining chair as opposed to a single linear actuator being disposed at a central portion of the powered lift or powered reclining chair.

BRIEF DESCRIPTIONS OF THE DRAWINGS

Various other features and attendant advantages of the present invention will be more fully appreciated from the following detailed description when considered in connection with the accompanying drawings in which like reference characters designate like or corresponding parts throughout the several views, and wherein.

Figure 4:
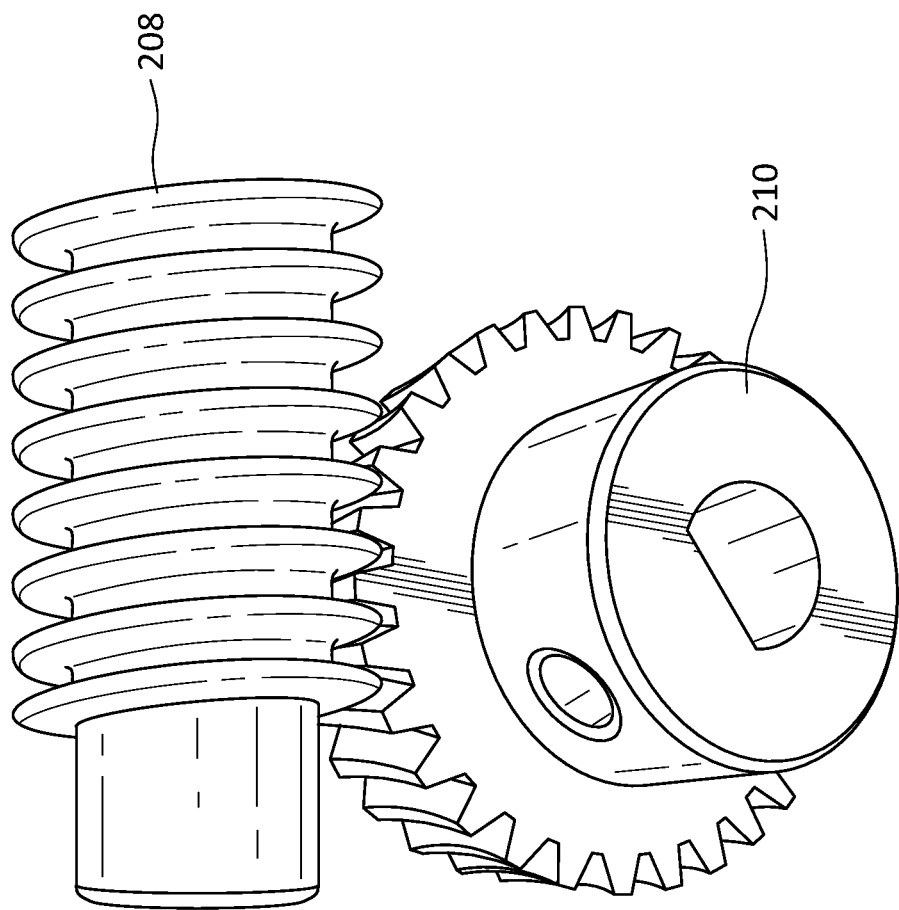
FIG. 4 is an enlarged drawing clearly showing how a threaded worm shaft integrates with a worm gear.
Figure 6:
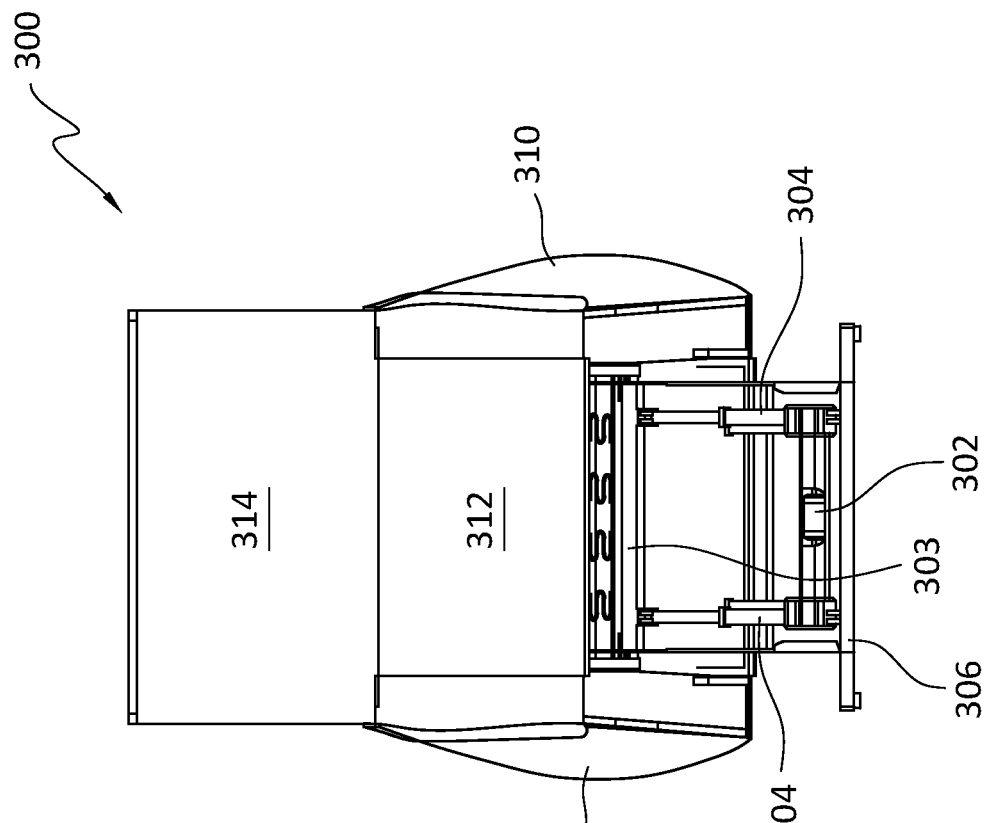
Figure 5:
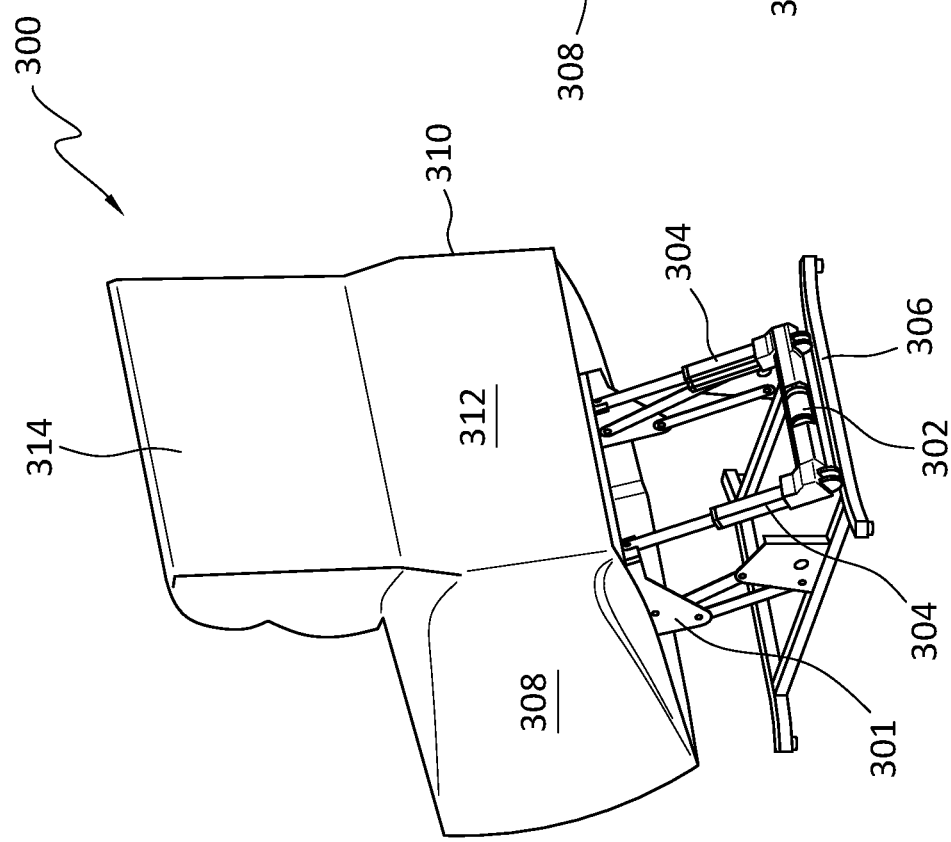

FIG. 5 is a rear, left side perspective view of a powered lift or powered reclining chair having the new and improved single drive motor-dual linear actuator system of the present invention installed thereon; and FIG. 6 is a schematic rear view of the powered lift or powered reclining chair as shown in FIG. 4 clearly illustrating the disposition of the dual linear actuators, as driven by the single, centrally located drive motor, and as laterally spaced with respect to each other, as well as their disposition near the left and right sides of the powered lift or powered reclining chair so as to support the entire chassis or framework of the powered lift or powered reclining chair in a stabilized manner.

DETAILED DESCRIPTION OF THE PREFERRED EMBODIMENT

Figure 1:
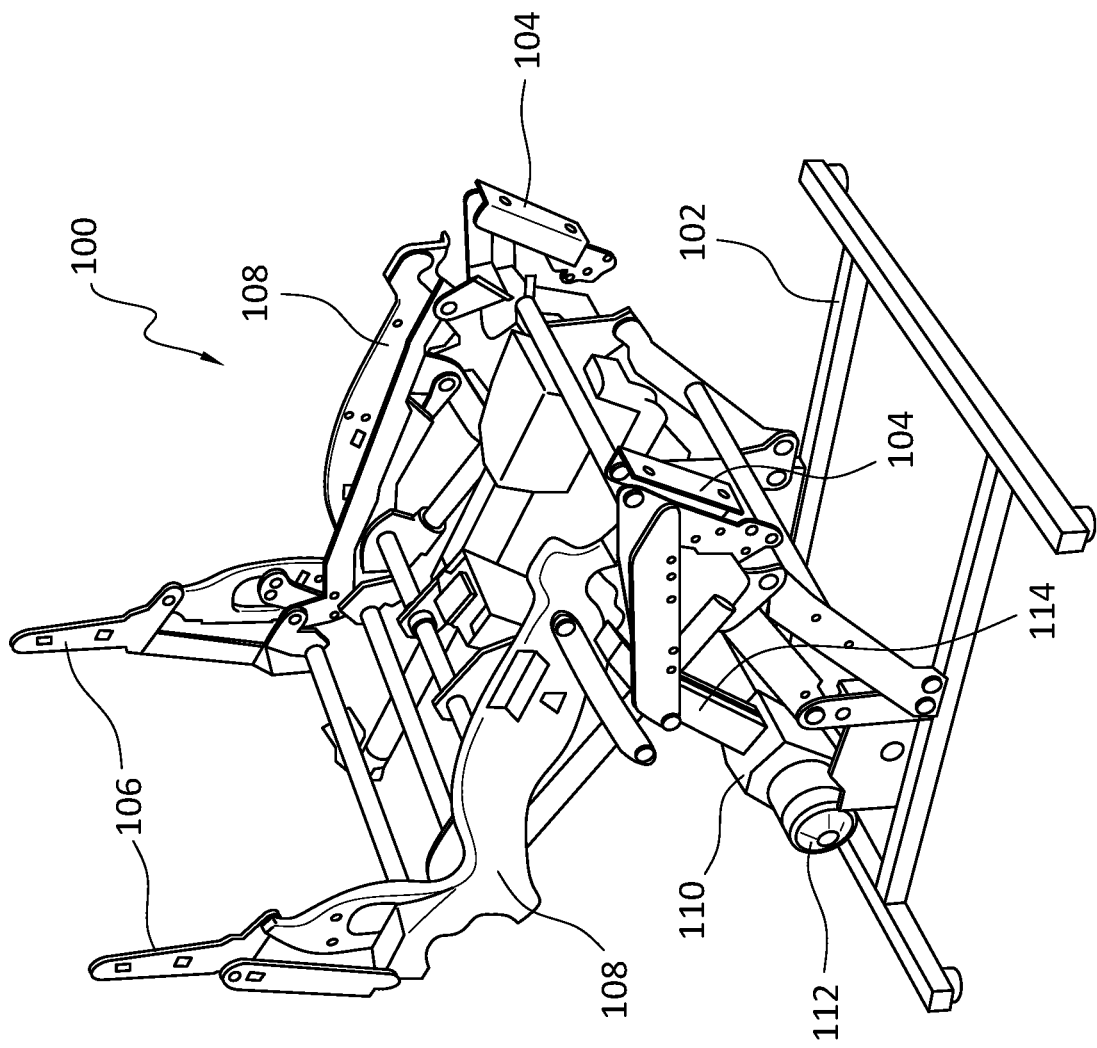
FIG. 1 is right side, front perspective view of a PRIOR ART powered lift or powered reclining chair showing the use of a single drive motor, and a single linear actuator driven by the single drive motor, as conventionally utilized to lift various components of a chassis or framework of the powered lift or powered reclining chair.
Figure 2:
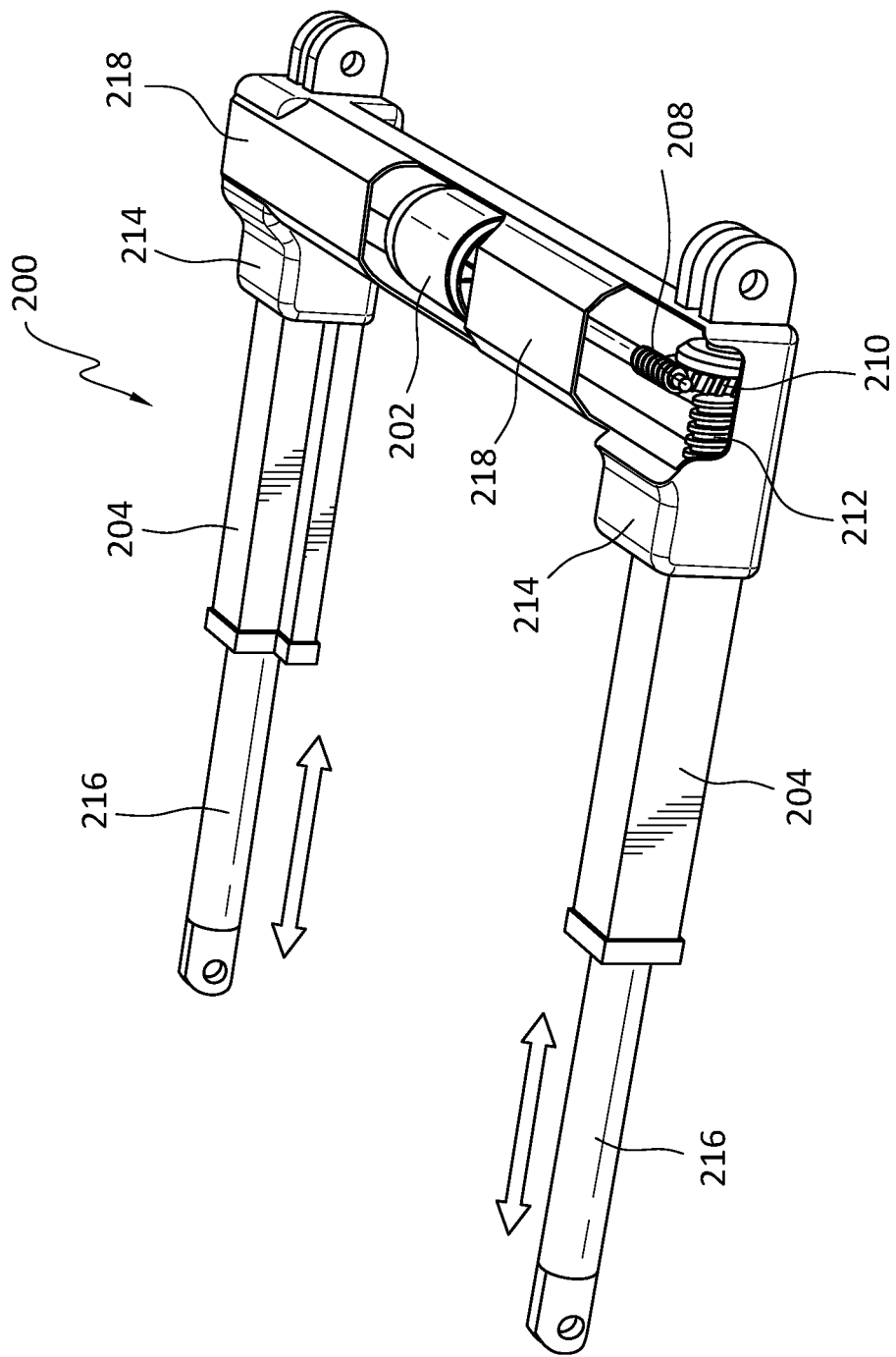
FIG. 2 is a top, perspective view of a new and improved single drive motor-dual linear actuator system as constructed in accordance with the principles and teachings of the present invention, and which may be incorporated within powered lift or powered reclining chairs.
Figure 3:
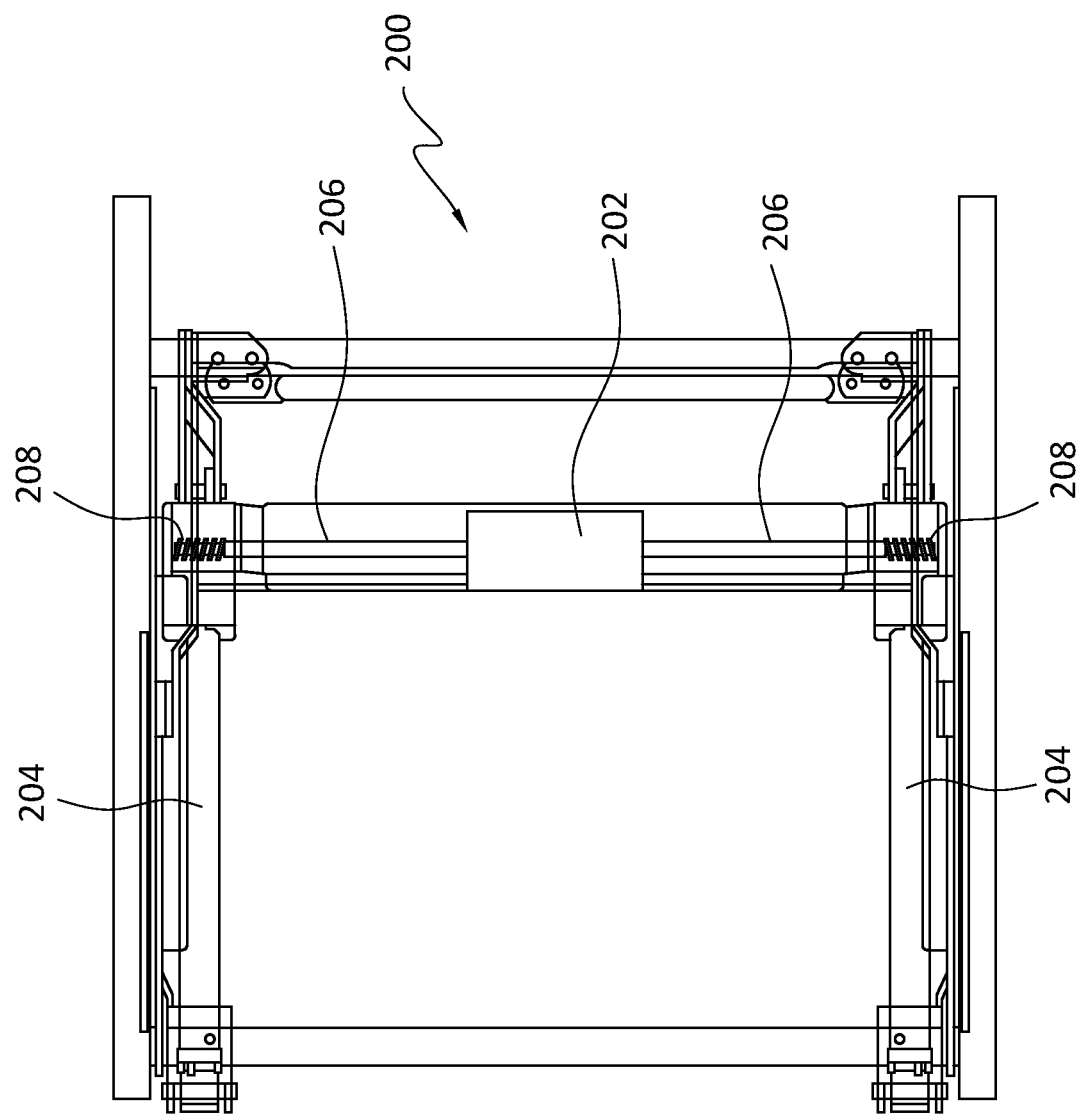
FIG. 3 is a schematic, top plan view of the new and improved single drive motor-dual linear actuator system as shown in FIG. 2, along with front and rear linear actuator stabilizer tubes connecting front and rear end portions of the pair of laterally spaced linear actuators together.

Referring now to FIGS. 2-4, a new and improved single drive motor-linear actuator system, as constructed in accordance with the principles and teachings of the present invention, is disclosed, is generally indicated by the reference character 200, and is adapted to be utilized in conjunction with powered lift chairs or powered reclining chairs. More particularly, it is seen that the new and improved single drive-motor linear actuator system 200 comprises a single drive motor 202 and a pair of laterally spaced linear actuators 204,204, wherein the single drive motor 202 is interposed between the pair of laterally spaced linear actuators 204,204. As can best be appreciated from FIG. 3, the single drive motor 202 comprises a pair of output drive shafts 206,206 which extend outwardly from opposite ends or sides of the single drive motor 202 so as to respectively extend in opposite directions toward the pair of laterally spaced linear actuators 204,204. Distal end portions 208,208 of the pair of the single motor output drive shafts 206,206 comprise oppositely threaded or left/right worm shafts which are adapted to operatively engage worm wheels 210,210 which are mounted upon proximal ends of linear actuator drive shafts 212,212 disposed internally within the linear actuators 204,204. FIG. 4 is an enlarged view disclosing the threaded interaction defined between the worm shaft 208,208 and the worm wheels 2120,210. The worm shafts 208,208 and the worm wheels 210,210 effectively define motor ends of the linear actuators 204,204, which are disposed within linear actuator motor end housings 214,214, while opposite ends of the linear actuators 204,204 comprise telescopic tube sections 216,216 which are adapted to move in and out of the linear actuators 204,204, as denoted by the double arrowheads adjacent to the telescopic tube sections 216,216, so as to be extended or retracted, depending upon the direction in which the worm shafts 208,208 are being driven by the drive motor 202 and whether or not the linear actuators 204,204 are to be extended or retracted in moving various components of a powered lift chair or a powered reclining chair. It is noted that the worm shafts 208,208 are normally disposed within covered housings 218,218, for safety purposes, although one of the housings 218,218 has been broken away in FIG. 2 so as to illustrate the threaded engagement defined between the worm shafts 208,208 and the worm wheels 210,210.

With reference lastly being made to FIGS. 5 and 6, there is shown a powered lift chair or a powered reclining chair 300 which comprises a chassis or framework, wherein only a downwardly depending mounting bracket 301 or a transversely extending cross beam 303 of which are visible in FIGS. 5 and 6, respectively. Chair 300 includes a chair base 306, left and right side portions 308, 310, a lower back or rear section 312, and an upper back section 314, and it is seen that the pair of laterally spaced linear actuators 304,304 are operatively connected between the chair base 306 and the chassis or framework of the chair 300. It is to be noted that component parts of the single drive motor-linear actuator system 200, as illustrated, for example, in FIG. 2, which correspond to component parts that have been illustrated within FIGS. 5 and 6 when incorporated upon the powered lift chair or powered reclining chair 300, have been provided with similar reference numbers, except that they are within the 300 series. As can be clearly appreciated from FIGS. 5 and 6, the pair of linear actuators 304,304 may be laterally spaced from each other by a predetermined distance and yet both linear actuators 304,304 are operatively connected to the chair base 306 at or near the left and right side portions 308,310 of the chair 300 such that both linear actuators 304,304 are simultaneously actuated in a synchronized manner and can therefore perform their required functions, when needed, so as to actuate different components of the powered lift or powered reclining chair 300 to their elevated, lowered, extended, or retracted positions in a coordinated manner. As a result of utilizing a single drive motor 302 for driving the pair of linear actuators 304,304, the weight and cost of the powered lift or powered reclining chair 300 is significantly reduced, as compared to a chair utilizing two drive motors to drive two linear actuators. Still yet further, the single drive motor-dual linear actuator system automatically synchronizes the actuation of the pair of linear actuators 304,304, as a result of the pair of linear actuators 304,304 being simultaneously driven by the single drive motor 302, whereby the stability of the chair 300 is markedly improved since the pair of linear actuators 304,304, driven by the single drive motor 302, are disposed along or near the left and right sides 308,310 of the powered lift or powered reclining chair 300 as opposed to a single linear actuator being disposed along a central axis of the powered lift or powered reclining chair. Lastly, reverting back to FIG. 3, if desired, the single drive motor-linear actuator system or assembly 200 may be provided with one or more stabilizer tubes 220 at fore, aft, and/or central positions.

Obviously, many variations and modifications of the present invention are possible in light of the above teachings. It is therefore to be understood that within the scope of the appended claims, the present invention may be practiced otherwise than as specifically described herein.

What is claimed is:

1. A linear actuator system, comprising:
   a single drive motor having first and second output drive shafts respectively disposed within a pair of first housings; and
   first and second linear actuators operatively engaged with said first and second output drive shafts of said single drive motor such that said first output drive shaft of said single drive motor drives said first linear actuator, while said second output drive shaft of said single drive motor drives said second linear actuator, wherein motor ends of said first and second linear actuators are disposed within second motor housings which are connected to said pair of first housings within which said first and second output drive shafts are disposed.

2. The linear actuator system as set forth in claim 1, wherein:
   said first and second linear actuators are operatively engaged with said first and second output drive shafts of said single drive motor such that said first output drive shaft of said single drive motor drives said first linear actuator, while said second output drive shaft of said single drive motor drives said second linear actuator, whereby said single drive motor drives both of said first and second linear actuators in a synchronized manner.

3. The linear actuator system as set forth in claim 1, wherein:
   said first and second linear actuators are operatively engaged with said first and second output drive shafts of said single drive motor by worm shaft-worm wheel gear mechanisms.

4. The linear actuator system as set forth in claim 3, wherein:
   said first and second output drive shafts of said single motor comprise first and second worm shafts having oppositely disposed left/right threads incorporated thereon; and
   said first and second linear actuators have first and second worm wheels incorporated therein for threadedly engaging said first and second worm shafts.

5. A linear actuator system for incorporation within a powered chair, comprising:
   a single drive motor having first and second output drive shafts respectively disposed within a pair of first housings; and
   first and second linear actuators operatively engaged with said first and second output drive shafts of said single drive motor such that said first output drive shaft of said single drive motor drives said first linear actuator, while said second output drive shaft of said single drive motor drives said second linear actuator, wherein motor ends of said first and second linear actuators are disposed within second motor housings which are connected to said pair of first housings within which said first and second output drive shafts are disposed.

6. The linear actuator system as set forth in claim 5, wherein:
   said first and second linear actuators are operatively engaged with said first and second output drive shafts of said single drive motor such that said first output drive shaft of said single drive motor drives said first linear actuator, while said second output drive shaft of said single drive motor drives said second linear actuator, whereby said single drive motor drives both of said first and second linear actuators in a synchronized manner.

7. The linear actuator system as set forth in claim 5, wherein:
   said first and second linear actuators are operatively engaged with said first and second output drive shafts of said single drive motor by worm shaft-worm wheel gear mechanisms.

8. The linear actuator system as set forth in claim 7, wherein:
   said first and second output drive shafts of said single motor comprise first and second worm shafts having oppositely disposed left/right threads incorporated thereon; and said first and second linear actuators have first and second worm wheels incorporated therein for threadedly engaging said first and second worm shafts.

9. The linear actuator system as set forth in claim 5, wherein:
said chair comprises a powered lift chair such that said first and second linear actuators, as driven by said first and second output drive shafts of said drive motor, can operate various components of said powered lift chair.

10. The linear actuator system as set forth in claim 9, wherein:
said powered lift chair comprises a base, a chassis, and left and right-side portions; and
said first and second linear actuators are operatively connected to said base and said chassis of said powered lift chair, and are laterally spaced from each other so as to be disposed near said left and right-side portions of said powered lift chair so as to provide enhanced stability to said powered lift chair when said first and second linear actuators are actuated.

11. The linear actuator system as set forth in claim 5, wherein:
said chair comprises a powered reclining chair such that said first and second linear actuators, as driven by said first and second output drive shafts of said drive motor, can operate various components of said powered reclining chair.

12. The linear actuator system as set forth in claim 11, wherein:
said powered reclining chair comprises a base, a chassis, and left and right-side portions; and
said first and second linear actuators are operatively connected to said base and said chassis of said powered reclining chair, and are laterally spaced from each other so as to be disposed near said left and right-side portions of said powered reclining chair so as to provide enhanced stability to said powered reclining chair when said first and second linear actuators are actuated.

13. A powered chair having a linear actuator system incorporated therein, wherein said linear actuator system comprises:
a single drive motor having first and second output drive shafts respectively disposed within a pair of first housings; and
first and second linear actuators operatively engaged with said first and second output drive shafts of said single drive motor such that said first output drive shaft of said single drive motor drives said first linear actuator, while said second output drive shaft of said single drive motor drives said second linear actuator, wherein motor ends of said first and second linear actuators are disposed within second motor housings which are connected to said pair of first housings within which said first and second output drive shafts are disposed.

14. The powered chair as set forth in claim 13, wherein:
said first and second linear actuators are operatively engaged with said first and second output drive shafts of said single drive motor such that said first output drive shaft of said single drive motor drives said first linear actuator, while said second output drive shaft of said single drive motor drives said second linear actuator, whereby said single drive motor drives both of said first and second linear actuators in a synchronized manner.

15. The powered chair as set forth in claim 13, wherein:
said first and second linear actuators are operatively engaged with said first and second output drive shafts of said single drive motor by worm shaft-worm wheel gear mechanisms.

16. The powered chair as set forth in claim 15, wherein:
said first and second output drive shafts of said single motor comprise first and second worm shafts having oppositely disposed left/right threads incorporated thereon; and
said first and second linear actuators have first and second worm wheels incorporated therein for threadedly engaging said first and second worm shafts.

17. The powered chair as set forth in claim 13, wherein:
said powered chair comprises a powered lift chair.

18. The powered chair as set forth in claim 13, wherein:
said powered chair comprises a powered reclining chair.

* * * * *